United States Patent [19]
Martinez et al.

[11] Patent Number: 5,809,096
[45] Date of Patent: Sep. 15, 1998

[54] DIGITAL TRANSMISSION SYSTEM COMPRISING DECISION MEANS FOR CHANGING THE SYNCHRONIZATION MODE

[75] Inventors: Georges Martinez, Caen; Jean-Michel Guillaud, Montgeron, both of France

[73] Assignee: U.S. Philips Corporation, NY, N.Y.

[21] Appl. No.: 659,381

[22] Filed: Jun. 6, 1996

[30] Foreign Application Priority Data

Jun. 8, 1995 [FR] France ............................... 95 06755

[51] Int. Cl.$^6$ ............................. H04L 7/00; H03D 3/24
[52] U.S. Cl. ........................................ 375/375; 375/326
[58] Field of Search ........................... 375/326, 371, 375/376, 229, 232, 316, 344, 373, 375; 329/306, 307, 308; 327/141

[56] References Cited

U.S. PATENT DOCUMENTS

| | | | |
|---|---|---|---|
| 4,916,405 | 4/1990 | Keate et al. | 329/308 |
| 5,128,968 | 7/1992 | Yoshida | 375/371 |
| 5,170,415 | 12/1992 | Yoshida et al. | 375/326 |
| 5,301,210 | 4/1994 | Vandamme et al. | 375/83 |
| 5,390,348 | 2/1995 | Magin et al. | 455/63 |
| 5,541,965 | 7/1996 | Daffara | 375/326 |
| 5,596,605 | 1/1997 | Kiyanagi et al. | 375/326 |
| 5,644,606 | 7/1997 | Martinez et al. | 375/326 |

FOREIGN PATENT DOCUMENTS

| | | |
|---|---|---|
| 0530107A1 | 3/1993 | European Pat. Off. |
| WO9510893 | 4/1995 | WIPO |

*Primary Examiner*—Tesfaldet Bocure
*Attorney, Agent, or Firm*—David R. Treacy

[57] ABSTRACT

A digital transmission system including synchronizing circuits for estimating and compensating for errors between a local oscillator signal and an input signal. The synchronizing circuits include a phase/frequency detector and correction circuit for correcting errors in an unlocked mode, and a phase detection and correction circuit for correcting errors in a locked mode. Requests for changing the synchronization circuits from the locked mode to the unlocked mode are implemented by state control circuits only after application of at least one decision condition. The state control circuits may also save and restore specific adjustments responsive to the decision condition.

14 Claims, 5 Drawing Sheets

DIGITAL TRANSMISSION SYSTEM COMPRISING DECISION MEANS FOR CHANGING THE SYNCHRONIZATION MODE

FIELD OF THE INVENTION

The invention relates to a digital transmission system comprising a transmitter and a receiver which includes synchronization means for estimating and compensating for synchronization errors between a local carrier and an input signal from the transmitter, the synchronization means comprising:

generator means for generating the local carrier, phase/frequency detection means producing a first error signal that corrects the synchronization errors in the unlocked mode, phase detection means producing a second error signal that corrects the synchronization errors in the locked mode, and control means determining requests that call for putting the synchronization means either in the unlocked mode or in the locked mode.

The invention likewise relates to a receiver used in such a system.

This may relate to systems for which an information signal, after having been transmitted via an electromagnetic wave modulation, is restored via coherent demodulation. These systems find their application in digital data transmission modems, radio relay links, space or optical communication systems in the case of heterodyne links.

BACKGROUND OF THE INVENTION

Carrier recovery devices are known to utilize a carrier recovery loop which comprises a local oscillator which is voltage controlled by an error signal resulting from the phase/frequency difference, which error signal measures a desynchronization between the local carrier produced by the local oscillator and the transmitted carrier.

A device of this type is described, for example, in the document U.S. Pat. No. 5,301,210 which relates to a coherent demodulating device with a carrier recovery circuit. For obtaining a rapid acquisition of the frequency and phase of the transmitted carrier, this device uses a recovery loop that adjusts the frequency and phase of the local oscillator relative to the transmitted carrier. In a first period of time, during the unlocked mode, a frequency detector is enabled for locking on to the local oscillator, after which, in a second time interval, during the locked mode, a phase detector performs a finer phase synchronization.

During their operation, digital transmission systems, especially those utilizing modulations coded by amplitude jumps and phase jumps, cause a receiver to receive input signals over a large dynamic range superimposed on noise. Considerable noise, albeit brief, may provoke a loss of synchronization and bring about the unlocking of the system and make it change at an undesirable time from the locked mode to the unlocked mode. In the latter mode the system may carry out various actions, such as resetting automatic gain controls to maintain an optimum gain control. The result be an excessively long period of time before the system comes back to the locked mode.

SUMMARY OF THE INVENTION

It is an object of the invention to render the device more robust in the presence of superimposed noise and to avoid the system changing to the unlocked mode if the characteristics of the superimposed noise do not justify this.

This object is achieved with a system and a receiver comprising state control means for defining modes of operation of the system, the state control means imposing at least one decision condition based on requests calling for a change in synchronization mode.

More particularly, the state control means require that a change from the locked mode to the unlocked mode be confirmed at least one time.

Thus, the change to the unlocked mode no longer takes place systematically once the change is asked for via the request. At least one confirmation is necessary which permits ignoring brief noise signals which are not actually representative of a degradation of the communication. The system is thus kept in the locked mode longer.

The system comprises means for regularly saving adjustments of the system in the locked mode and for selectively restoring said adjustments in accordance with priority levels assigned to the requests. Thus, when there is a request, the system has already saved, for example, automatic gain control adjustments, local carrier frequency adjustments, clock frequency adjustments, equalization coefficient values or other adjustment values. During changes to the locked mode in response to a request, the state control means restore the saved automatic gain control adjustments or the saved local carrier frequency adjustments. As a result, if the request is not confirmed in the next cycle, because the noise was of a short duration, the gain controls, for example, are immediately correct for decoding the received signal once the locked mode has been confirmed. It is thus no longer necessary, to wait for the gain controls to come back to correct values in order to re-establish the previous performance. This also applies to adjustments of the frequency and/or phase correction signals which are left to develop as planned once they have been restored.

The appearance of a request forms an alarm which may be used for indicating the operation of the system. It is possible to provide various cascaded alarm levels and each alarm level may lead to different actions.

These and other aspects of the invention will be apparent from and elucidated with reference to the embodiments described hereinafter.

DESCRIPTION OF EMBODIMENTS

Figure 5:
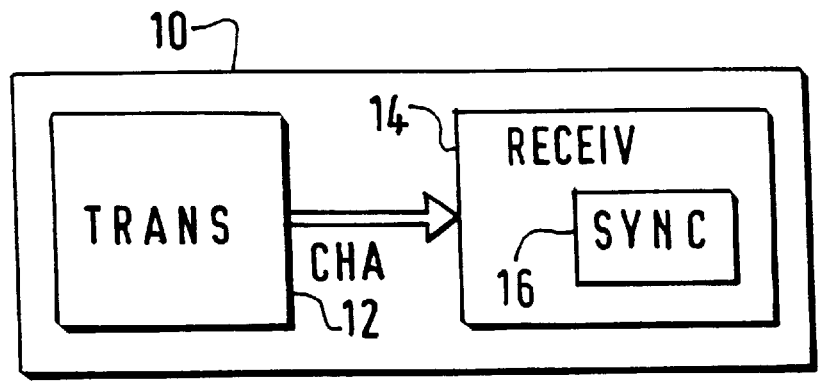
FIG. 5 is a general diagram of a digital transmission system.

FIG. 5 is a general diagram of a digital signal transmission system which comprises a transmitter TRANS 12 which transmits digital code-modulation data to a receiver RECEIV 14. The transmission is performed by a channel CHA. The receiver comprises synchronization means SYNC 16 for synchronizing a local carrier with the carrier of the transmitter.

Figure 1:
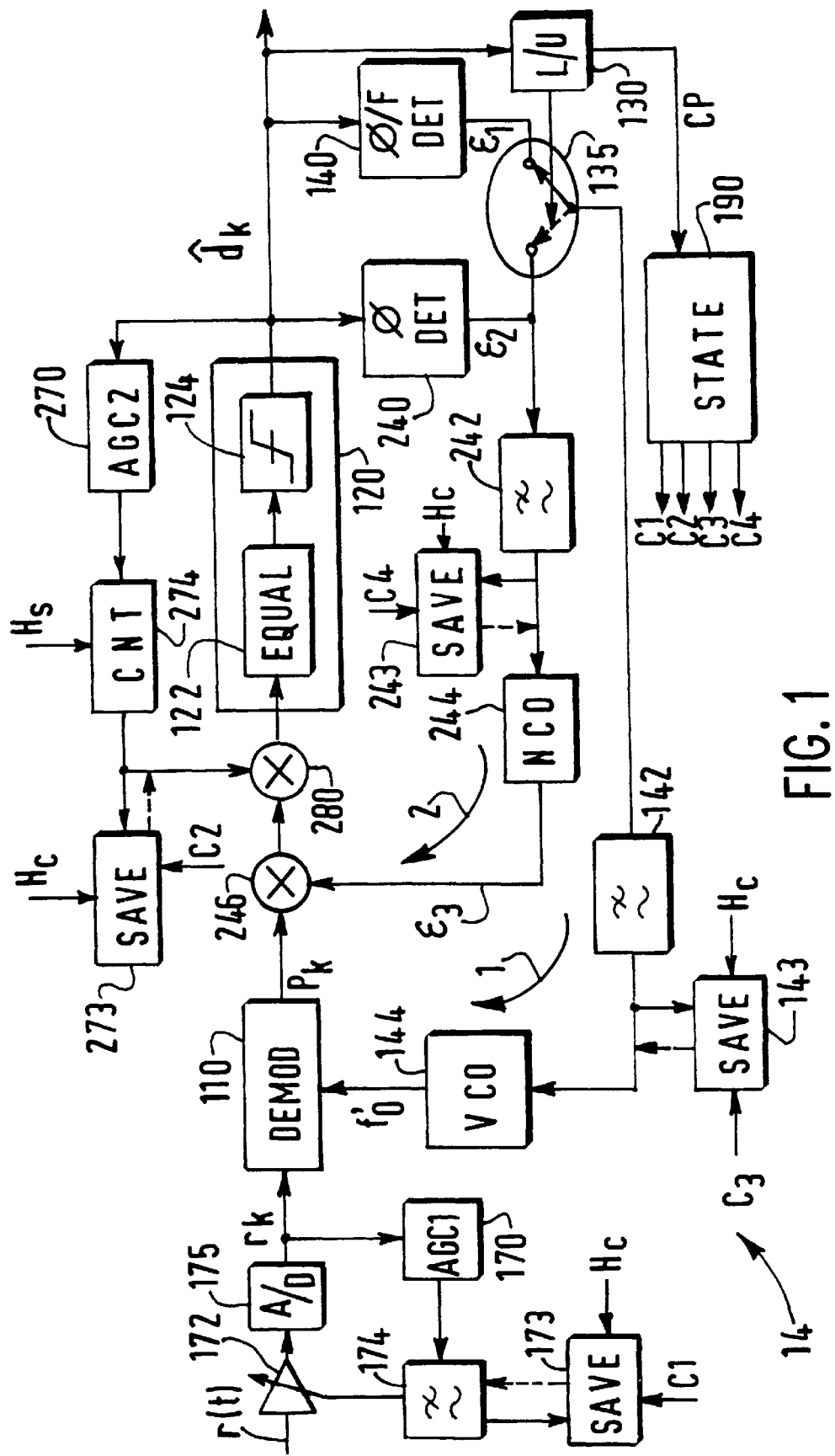
FIG. 1 is a diagram of an example of a receiver according to the invention, comprising two correction loops.

FIG. 1 is a diagram of the receiver 14 according to a preferred embodiment of the invention. A signal r(t) received with an intermediate frequency IF enters an amplifier 172 whose gain is controlled by an automatic gain control device AGC1 170 via an integrator filter 174. At the output of the amplifier, the signal is sampled by an analog/digital converter 175 with the clock frequency of the transmitted symbols (samples $r_k$), then demodulated in demodulator 110, so that a signal $p_k$ is produced formed by an in-phase component I and a quadrature phase component Q in quadrature with the carrier. The index k is the sample number. Processing means 120 process the signal $p_k$ to produce symbols $\hat{d}_k$ which are estimates of the symbols $d_k$ of the code modulation used in transmission. The processing means 120 comprise decision means 124 preceded, if necessary, by equalization means EQUAL 122.

The carrier recovery means are used for establishing a frequency and phase synchronization of a local oscillator with the intermediate frequency carrier. In the case where frequency offsets appear between the frequencies of the two carriers, and in the case where this frequency offset is compatible with the capturing domain of carrier recovery circuits, these circuits cause the frequency of the local oscillator to become identical with the frequency of the IF carrier, which causes the carrier recovery circuits to change from an unlocked mode (U) to a locked mode (L). When the frequency of the local oscillator is locked, the carrier recovery circuits then perform a phase synchronization of the two carriers.

For employing these two modes of operation in the preferred embodiment of the invention, the carrier recovery circuits comprise a first loop 1 which attempts to achieve frequency locking during the unlocked mode, and a second loop 2 which works for the phase synchronization during the locked mode, to complete the corrections for the synchronization errors that have not been corrected by the first loop. The error signal of a phase detector is thus used by the two loops.

During the unlocked mode, the first loop comprises a phase/frequency detector 140 which produces the first error signal $\epsilon 1$ which is filtered by a first low-pass loop filter 142, the first error signal thus filtered controlling a voltage-controlled oscillator VCO 144. The oscillator 144 produces a local carrier $f_\theta$ which it keeps synchronized with the carrier of the intermediate frequency signal.

When the local oscillator has thus been frequency locked and possibly imperfectly phase locked, it is generally necessary to perfect the phase synchronization because the phase jitter may be considerable. This is effected in this preferred embodiment with the aid of the second loop 2 which comprises a phase detector 240 that produces a second error signal $\epsilon 2$ which is filtered by a second low-pass loop filter 242. The second error signal $\epsilon 2$, after filtering, forms a command for a digital oscillator NCO 244 which produces a phase correction signal $\epsilon 3$. A mixer 246, arranged between the demodulator 110 and the processing means 120, mixes the sampled signal $p_k$ with the phase correction signal $\epsilon 3$ to correct the phase of the signal $p_k$. The signal $p_k$ which is formed by an in-phase component and a quadrature phase component leads to the phase correction signal $\epsilon 3$ also being formed by two components which are mutually in quadrature.

The second loop is also controlled by automatic gain control means. Therefore, the output of the processing means 120 is connected to a second automatic gain control device AGC2 270. The latter is followed by a low-pass filter realized, for example, in the form of a counter CNT 274 which integrates correction values produced by the device AGC 2. The output of the counter 274 enters an input of a multiplier 280 which is arranged between the output of the mixer 246 and the input of the processing means 120. The automatic gain control of the signal $p_k$ may be arranged differently while still achieving the object of the invention.

The phase/frequency detector 140 and the phase detector 240 are connected to an output of processing means 120. They may be connected either to the output of decision means 124, or to the output of equalization means 122. The detectors, 140, 240 operate digitally.

The demodulator 110, the mixer 246 and the processing means 120 preferably perform a digital processing. Nevertheless, it is possible that all these elements or certain elements of these perform an analog processing, in which case the sampling means 175 may be arranged either at the output of the demodulator 110, of the mixer 246 or of the processing means 120 respectively, to obtain a mixed analog/digital operation.

The first loop 1 is to have a natural frequency that is low enough to tolerate the processing delays resulting from the processing performed, but nevertheless high enough to ensure the desired recovery of the maximum frequency offset.

The natural frequency of a loop is determined by the time constants of the loop filter, the gain of the VCO, the static gain of the phase detector. The noise band of the loop results from this natural frequency.

The second loop 2 is to have a higher natural frequency than that of the first loop 1, so as to permit the second loop to complete the corrections imposed by the first loop.

When the oscillator 144 is locked (L-mode), a mode detector L/U 130 activates switch means 135 which connect the first filter 142 to the output of the phase detector 240 to make the first loop 1 operate with the phase error signal $\epsilon 2$ produced by the phase detector 240. Thus, by utilizing the same phase detector in the two loops, lock-on conflicts are avoided, because the corrections imposed by the loops 1 and 2 are always in-phase.

Figure 7:
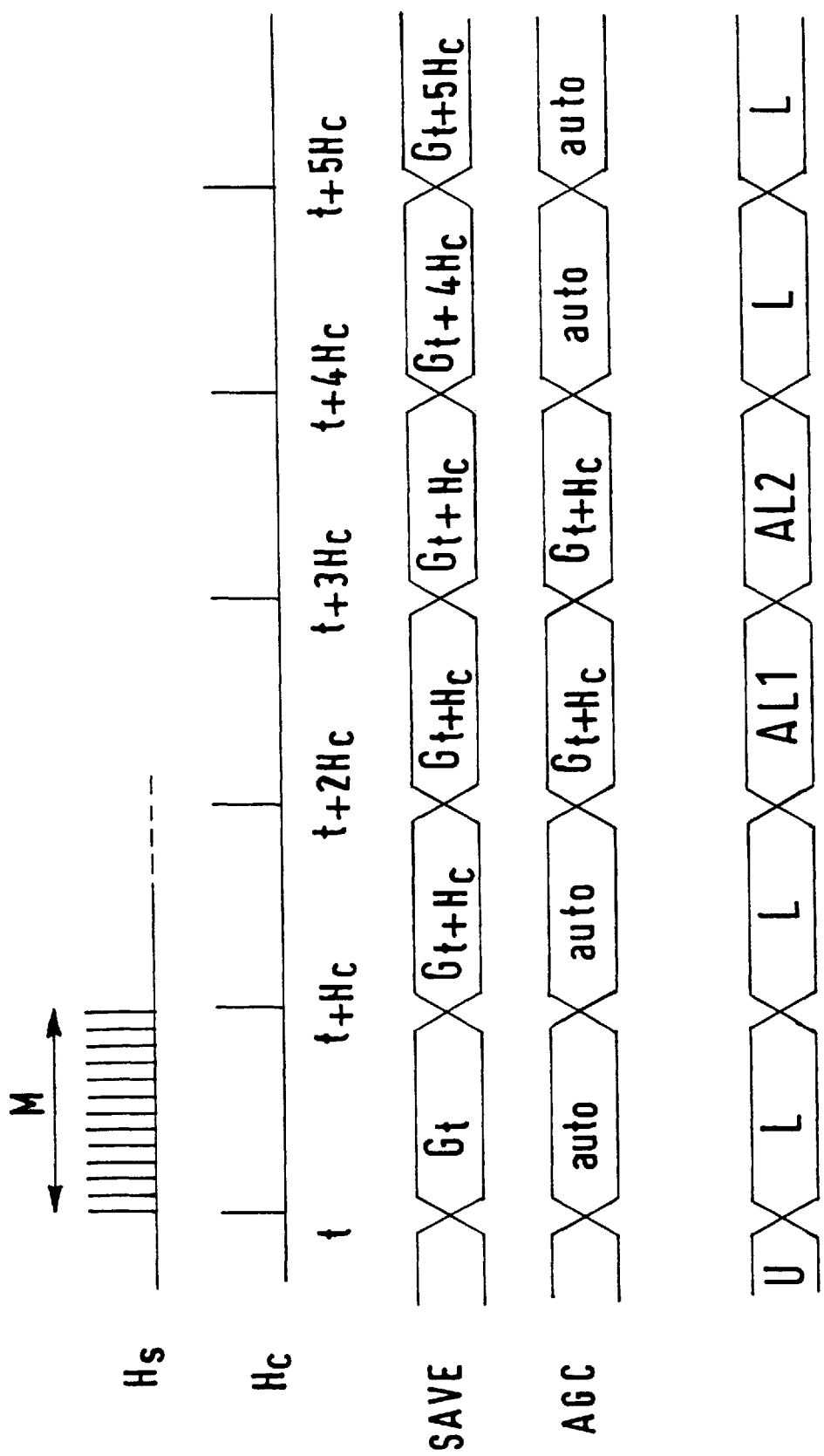
FIG. 7 is a timing diagram relating to saving and restoring adjustments.

During the operation of the system, adjustments are regularly saved in save devices. Thus, the correction values accumulated by the counter 274 are saved in save means SAVE, for example, a register 273. The counter 274 operates, for example, at the rate $H_s$ of the symbols transmitted by the transmitter. The register 273 then saves after various symbol periods, for example, at the rate defined by a clock $H_c$ which is M times less fast than the rate $H_s$. FIG. 7 shows a timing diagram of the two clocks $H_s$ and $H_c$.

Similarly, the adjustments of the automatic gain control AGC 1 are saved in save means 173. The adjustments of the oscillator VCO and those of the digital oscillator NCO are saved in the respective save means 143 and 243. These means save the adjustments and restore the saved adjustments (dotted line connections) under the control, for example, of the clock $H_c$ and their respective commands C1, C2, C3, C4.

These various commands apply different alarm levels. The state controller STATE 190, connected to the output of the mode detector 130, supplies the commands C1, C2, C3 and C4 as a function of the state of the system and of the decisions planned. These commands act on the operation of the devices AGC1 170, AGC2 270 and of the oscillators VCO 144 and NCO 244 via their respective save devices for applying the adjustments that correspond to the mode in which the system is, for example, by restoring the adjustments existing prior to a request calling for changing to the unlocked mode. They may also occur for saving and then restoring other adjustments of the system, for example, the sampling rate of the analog/digital converter A/D synchronized with the rate of the outgoing symbols, the values of the equalization coefficients of the equalization means 122, or other adjustments.

Figure 2A:
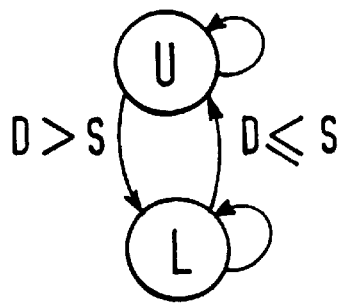
FIGS. 2A–2C are three graphs A, B, C showing the transitions between the unlocked mode and the locked mode with a zero level, a one-level and two alarm levels, respectively.
Figure 2B:
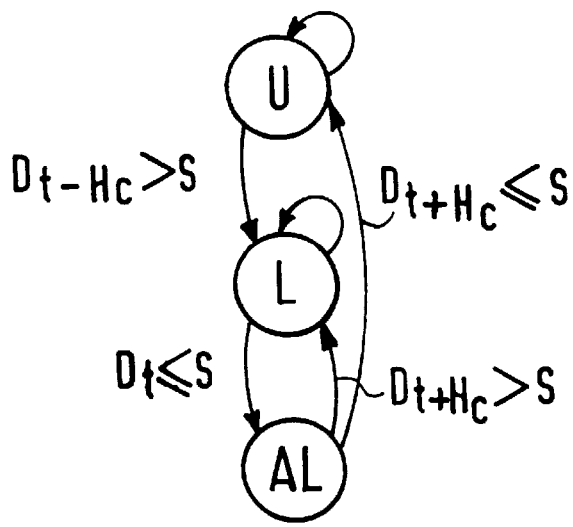
Figure 2C:
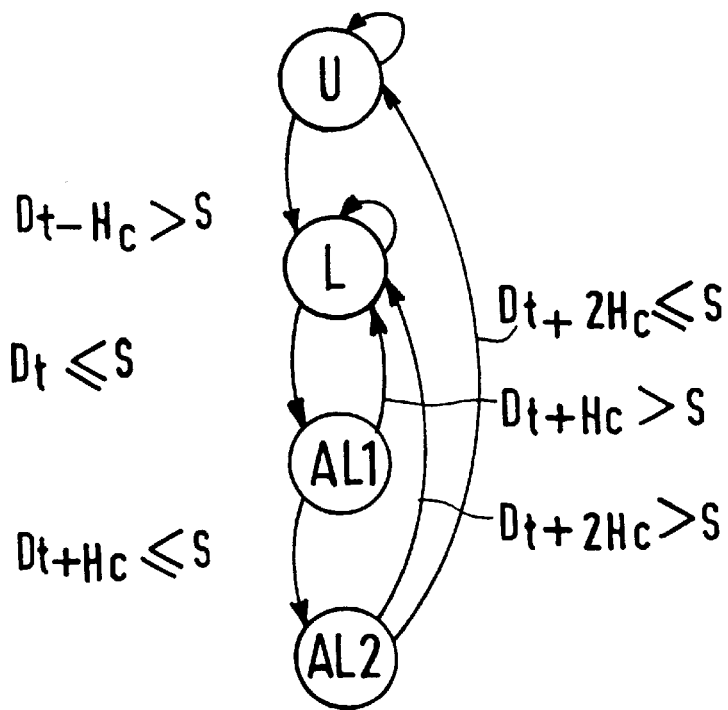

FIGS. 2A–2C are graphs representing the generation of these commands. FIG. 2A relates to the conventional case for which no alarm level is generated. To determine whether the device is to be placed in the locked mode L or in the unlocked mode U, conventionally a number of times D is determined when the estimated signal is situated in a predetermined zone surrounding the state of the constellation (FIG. 3) for a given duration $H_c$. This given duration is, for example, the duration of a clock period $H_c$. When this number is higher than a given threshold S, it is estimated that the system is suitable for use in the locked mode L. When this number is lower than or equal to the given threshold S, it is estimated that the system is to be placed in the unlocked mode U. The graph of FIG. 2A indicates the conditions for changing from one mode to the other. This graph corresponds to the case described by the prior art. Evidently, a locked state L (an unlocked state U, respectively) can immediately be followed by another locked state L (by another unlocked state U, respectively).

Figure 3:
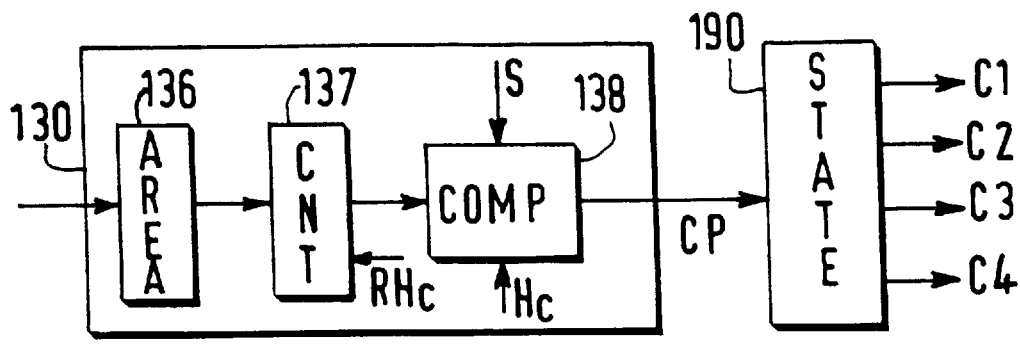
FIG. 3 is a diagram of control means which decide mode changes.

FIG. 3 shows that the mode detector 130 comprises an area detector AREA 136 which receives the estimated symbol $\hat{d}_k$ and determines whether this symbol lies inside the areas defined around each state of the constellation. A counter CNT 137 determines the number of times D when the estimated symbol lies in said areas. The counter may be reset to zero via a command $RH_c$ which is given at the clock rate $H_c$. The comparator COMP 138 compares the determined value D with a given threshold S. A request CP is then transmitted to make the system change from the unlocked mode to the locked mode or vice versa depending on the result of this comparison, or to leave it in the current mode.

According to the invention, the request is sent to the state controller 190 to manage the decisions and send out alarms. FIG. 2B represents the case with the single alarm level AL. Let us consider the system in the locked mode L. It is observed that in the situation for which one has: $D_t \leq S$ at an instant t, the system then goes to an alarm state AL and does not immediately go to the unlocked mode U. If at the next instant t+Hc a situation such as: $D_{t+Hc} > S$ is observed, the system then comes back to the locked mode L. On the other hand, if at the instant t+Hc a situation such as: $D_{t+Hc} \leq S$ is observed, the system comes back to the unlocked mode U. Thus it is accepted that the change to the unlocked mode U is delayed if in the next cycle (rate $H_c$) the transgression of the threshold S again appears, which makes it possible to return then to the locked mode L.

Similarly, it is possible to provide various levels of alarm AL1, AL2 as this is indicated in FIG. 2C. In this case, at instant t+Hc, the system being in a state of alarm AL1, a situation such as: $D_{t+Hc} > S$ is observed, the system comes back to the locked mode L. On the other hand, if at instant t+Hc a situation such as: $D_{t+Hc} \leq S$ is observed, the system does not come back to the unlocked mode U, but goes to a second alarm level AL2. Only if at instant t+2Hc a situation such as: $D_{t+2H} > S$ is observed will the system come back to the locked mode L. Conversely, that is to say, $D_{t+2Hc} \leq S$, the system comes back to the unlocked mode U. Thus a first alarm level AL1 is accepted for saving, for example, the adjustments of the device AGC1 and a second alarm level AL2 for saving, for example, the adjustments of the device AGC2 and of the oscillators VCO and/or NCO. Other combinations are possible.

Based on that which has just been explained, a person of ordinary skill in the art can similarly construct without any difficulty a cascade system of alarm levels for selectively making interventions in the system.

During these states of alarm, certain actions are conducted to avoid the system losing the correct adjustments of the locked mode in which it is before the appearance of the request. More particularly, the request may be the consequence of a brief noise signal. In that case it is unfavorable to lose the adjustments, because the recovery thereof could take too long a period of time which diminishes the performance of the system. For managing these decisions and avoiding, for example, the automatic gain control devices following untimely variations of the signal, the state controller 190 supplies commands C1, C2, C3, C4 intended to occur as this has previously been described.

Figure 4:
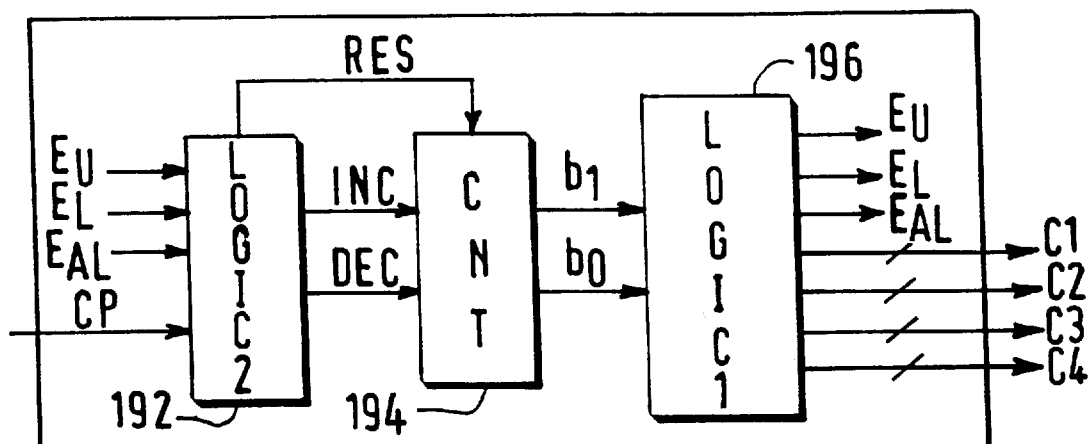
FIG. 4 is a diagram of state control means.

The state controller 190 is used for generating the various commands while taking account of requests and of the state in which the system is at the moment a request appears. A diagram of the state controller 190 is represented in FIG. 4. It comprises a counter CNT 194, for example, a two-bit b0, b1 counter for managing the operation of a system that has a single alarm level. Depending on the state of the bits b0, b1, a first logic block LOGIC1 196 generates state commands $E_U$, $E_L$, $E_{AL}$ which relate to the unlocked state U, the locked state L and the alarm state AL, respectively. A first logic block 196 also supplies the commands C1, C2, C3, C4. The state commands $E_U$, $E_L$, $E_{AL}$ are looped to the inputs connected to a second logic block LOGIC2 192 of the state controller 190. The second logic block also receives the requests CP coming from the mode detector L/U 130. The second logic block 192 produces increment commands INC, decrement commands DEC and reset-to-zero commands RES for the counter 194.

An example of the operation of the state controller is described by the Tables I, II, III and IV representing truth tables which relate to the counter, the first and the second logic blocks.

To each state $E_U$, $E_L$, $E_{AL}$ is assigned a binary word b0, b1, in accordance with the following Table I

TABLE I

| b1 | b0 | $E_U$ | $E_L$ | $E_{AL}$ |
|----|----|----|----|------|
| 0  | 0  | 1  | 0  | 0    |
| 0  | 1  | 0  | 1  | 0    |
| 1  | 0  | 0  | 0  | 1    |
| 1  | 1  | 0  | 0  | 0    |

On the other hand, the second logic block 192 supplies to the counter the commands INC, DEC and RES in accordance with the following Table II.

TABLE II

| CP | $E_U$ | $E_L$ | $E_{AL}$ | INC | DEC | RES |
|----|----|----|------|-----|-----|-----|
| 0  | 1  | 0  | 0    | 0   | 0   | 0   |
| 0  | 0  | 1  | 0    | 1   | 0   | 0   |
| 0  | 0  | 0  | 1    | 0   | 0   | 1   |

TABLE II-continued

| CP | $E_U$ | $E_L$ | $E_{AL}$ | INC | DEC | RES |
|---|---|---|---|---|---|---|
| 1 | 1 | 0 | 0 | 1 | 0 | 0 |
| 1 | 0 | 1 | 0 | 0 | 0 | 0 |
| 1 | 0 | 0 | 1 | 0 | 1 | 0 |

A request CP=0 corresponds to a transition from the unlocked mode to the locked mode. A reverse request CP=1 corresponds to the reverse transition. The commands INC DEC and RES depend on the state $E_U$, $E_L$, $E_{AL}$ in which the system is at the moment of the request.

Depending on the state of the commands INC, DEC and RES, the state of the counter may be modified as represented in the following Table III.

TABLE III

| INC | DEC | RES | CNT |
|---|---|---|---|
| 0 | 0 | 0 | $CNT_{k-1}$ |
| 1 | 0 | 0 | $CNT_{k-1} + 1$ |
| 0 | 1 | 0 | $CNT_{k-1} - 1$ |
| 1 | 1 | 0 | NA |
| x | x | 1 | 0 |

Two simultaneous commands INC=1 and DEC=1 are not authorized (NA) by the controller. When RES=1, the counter is reset to zero whatever the values of INC and DEC (references x).

The commands C1 to C4 applied to the elements already described, validated by the clock $H_c$, are generated by the first logic block 196 while a distinction is made between the save command C2(S) and the restore command C2(R). These commands are clearly dependent on the state of the system $E_U$, $E_L$, $E_{AL}$. The Table IV indicates these possibilities.

TABLE IV

| b1 | b0 | C2(S) | C2(R) |
|---|---|---|---|
| 0 | 0 | x | x |
| 0 | 1 | 1 | 0 |
| 1 | 0 | 0 | 1 |
| 1 | 1 | x | x |

Reference 1 indicates that the command C2(S) or C2(R) is active, reference 0 indicates that they are inactive. Reference x indicates that they may be either in the 1-state or in the 0-state.

FIG. 7 represents a diagram which shows how adjustments are saved and after that restored in accordance with the state of the system. The savings are realized at the clock rate Hc thus at the instants t, t+Hc, t+2Hc, t+3Hc . . . Let us suppose that at instant t the system changes to the locked state L. At that instant the save device SAVE saves the value of the gain $G_t$ at instant t. Between the instants t and t+Hc, the gain value automatically evolves to another value $G_{t+Hc}$. This value is then saved at instant t+Hc. Let us suppose that at the instant t+2Hc the system changes to the alarm level AL1. In that case, according to the invention, in the next period it is the gain $G_{t+Hc}$ that will be restored and will be applied between the instants t+2Hc and t+3Hc. Thus, the gain will remain stable during this period and will not be able to develop freely. This situation will be prolonged if a second alarm level AL2 succeeds level AL1. If at instant t+4Hc the system again changes to the locked mode L, the gain will again begin to vary freely.

Figure 6:
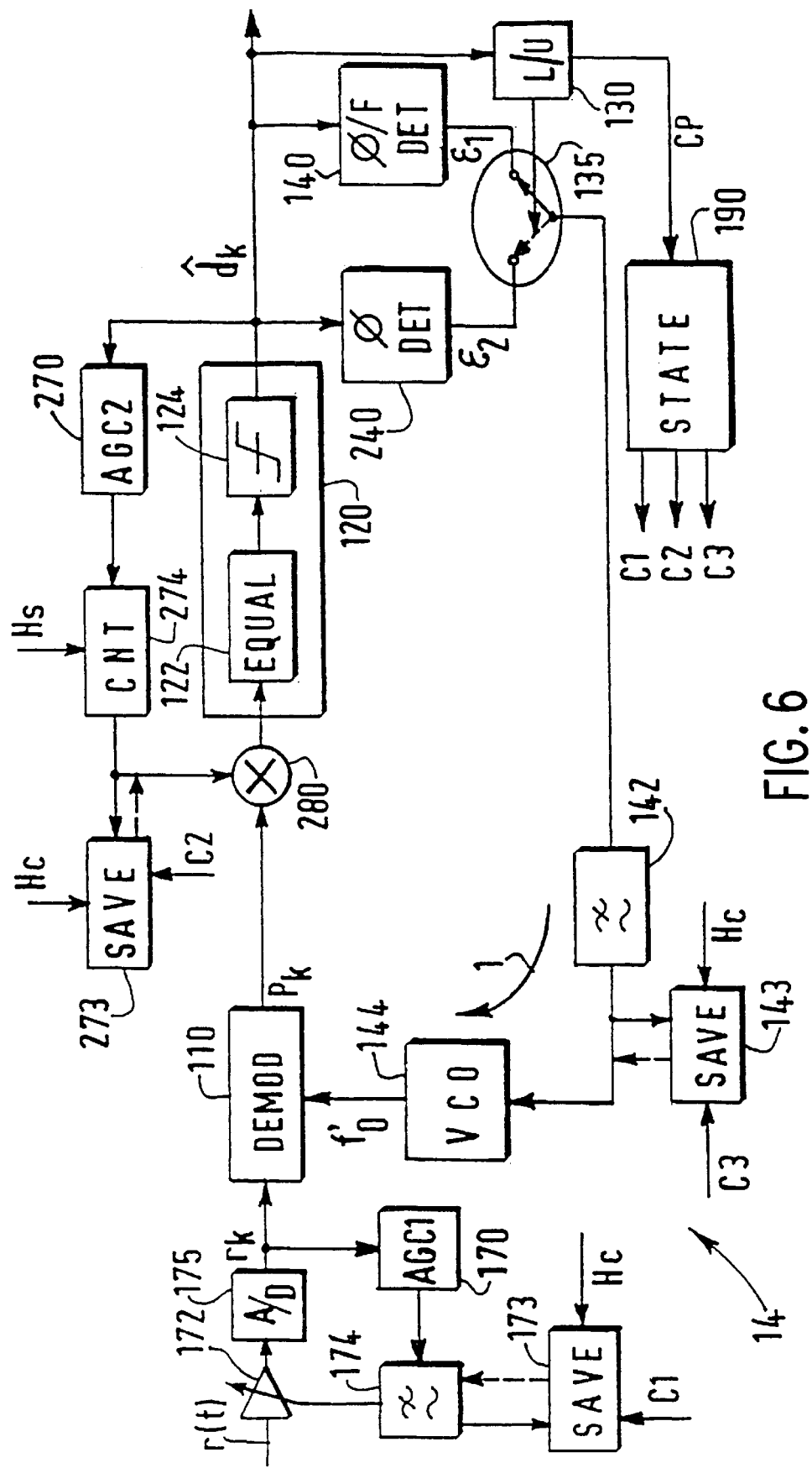
FIG. 6 is a diagram similar to that of FIG. 1, with the receiver comprising a single loop.

The invention has just been described in the case of a preferred embodiment which relates to a digital transmission system that makes use of two synchronization loops. Other configurations of the synchronization means are also possible. Notably, the transmission system may include only a single loop as is represented in FIG. 6. This diagram is similar to FIG. 1 except for omission of the low-pass filter 242, the digital oscillator 244, the mixer 246 and the save device 243. All other elements have the same reference numerals and functions, and the description of operation of this single loop synchronization means is the same as the description of FIG. 1 except for the omitted elements.

We claim:

1. A digital transmission system comprising a transmitter and a receiver, in which the receiver includes synchronization means for estimating and compensating for synchronization errors between a local carrier and an input signal from the transmitter, the synchronization means comprising:

generator means for generating the local carrier, phase/frequency detection means producing a first error signal that corrects the synchronization errors in the unlocked mode, phase detection means producing a second error signal that corrects the synchronization errors in the locked mode, and control means determining a response to requests that call for putting the synchronization means either in the unlocked mode or in the locked mode, characterized in that the system comprises state control means for defining modes of operation of the system, and responsive to receipt of one of said requests, before defining the requested mode the state control means imposes at least one decision condition which must be satisfied in addition to the one request.

2. System as claimed in claim 1, characterized in that the state control means decide a change from the locked mode to the unlocked mode on condition that the request calling for changing to the unlocked mode be confirmed at least one time.

3. The system as claimed in claim 1, characterized in that it comprises means for saving adjustments of the system in the locked mode, the state control means selectively restoring said adjustments in accordance with priority levels assigned to the requests.

4. The system as claimed in claim 3, characterized in that the saved adjustments are automatic gain control adjustments, local carrier frequency adjustments, clock frequency adjustments, equalization coefficient values.

5. The system as claimed in claim 4, characterized in that the state control means restore the saved automatic gain control adjustments during changes to the locked mode made in response to a request.

6. The system as claimed in claim 4, characterized in that the state control means restore the saved local carrier frequency adjustments during changes to the locked mode in response to a request.

7. A receiver for a digital transmission system, which receiver includes synchronization means for estimating and compensating for synchronization errors between a local carrier and an input signal, the synchronization means comprising:

generator means for generating the local carrier, phase/frequency detection means producing a first error signal that corrects the synchronization errors in the unlocked mode, phase detection means producing a second error signal that corrects the synchronization errors in the locked mode, and control means determining a response to requests that call for putting the synchronization means either in the unlocked mode or in the locked mode, characterized in that the receiver comprises state control means for defining modes of operation of the receiver, and responsive to receipt of one of said requests, before defining the requested mode the state control means imposes at least one decision condition in addition to the one request.

8. Receiver as claimed in claim 7, characterized in that the state control means decide a change from the locked mode to the unlocked mode on condition that the request calling for changing to the unlocked mode be confirmed at least one time.

9. The receiver as claimed in claim 7, characterized in that it comprises means for saving adjustments of the system in the locked mode, the state control means selectively restoring said adjustments in accordance with priority levels assigned to the requests.

10. The receiver as claimed in claim 9, characterized in that the saved adjustments are automatic gain control adjustments, local carrier frequency adjustments, clock frequency adjustments, equalization coefficient values.

11. The receiver as claimed in claim 10, characterized in that the state control means restore the saved automatic gain control adjustments during changes to the locked mode made in response to a request.

12. The receiver as claimed in claim 10, characterized in that the state control means restore the saved local carrier frequency adjustments during changes to the locked mode in response to a request.

13. The system as claimed in claim 2, characterized in that it comprises means for saving adjustments of the system in the locked mode, the state control means selectively restoring said adjustments in accordance with priority levels assigned to the requests.

14. The receiver as claimed in claim 8, characterized in that it comprises means for saving adjustments of the system in the locked mode, the state control means selectively restoring said adjustments in accordance with priority levels assigned to the requests.

* * * * *